(12) United States Patent
Hines

(10) Patent No.: US 11,042,842 B2
(45) Date of Patent: Jun. 22, 2021

(54) SYSTEM AND METHOD FOR A DEVICE TO WORK COLLABORATIVELY WITH AN EXPERT

(71) Applicant: Douglas Winston Hines, Lincoln Park, NJ (US)

(72) Inventor: Douglas Winston Hines, Lincoln Park, NJ (US)

( * ) Notice: Subject to any disclaimer, the term of this patent is extended or adjusted under 35 U.S.C. 154(b) by 934 days.

(21) Appl. No.: 14/528,143

(22) Filed: Oct. 30, 2014

(65) Prior Publication Data
US 2016/0125312 A1 May 5, 2016

(51) Int. Cl.
*G06Q 10/10* (2012.01)
*G06N 5/00* (2006.01)

(52) U.S. Cl.
CPC .......... *G06Q 10/103* (2013.01); *G06N 5/00* (2013.01)

(58) Field of Classification Search
None
See application file for complete search history.

(56) References Cited

U.S. PATENT DOCUMENTS

| | | | |
|---|---|---|---|
| 5,231,693 A | 7/1993 | Backes et al. | |
| 6,466,663 B1 * | 10/2002 | Ravenscroft | G06F 3/0481 379/265.01 |
| 6,829,585 B1 | 12/2004 | Grewal et al. | |
| 7,007,235 B1 | 2/2006 | Hussein et al. | |
| 7,120,647 B2 | 10/2006 | Venkatesh et al. | |
| 7,152,050 B2 | 12/2006 | Aoyama et al. | |
| 7,739,329 B2 * | 6/2010 | Thompson | G06Q 30/02 709/203 |
| 8,117,196 B2 | 2/2012 | Jones et al. | |
| 8,527,094 B2 | 3/2013 | Kumar et al. | |
| 8,594,305 B2 * | 11/2013 | Da Palma | H04M 3/51 379/265.07 |
| 2005/0147218 A1 * | 7/2005 | Novack | H04L 12/66 379/88.18 |
| 2005/0204438 A1 | 9/2005 | Wang et al. | |
| 2009/0245500 A1 * | 10/2009 | Wampler | H04M 3/42382 379/265.09 |
| 2010/0010673 A1 | 1/2010 | Wang et al. | |
| 2010/0169426 A1 | 7/2010 | Dreyfus et al. | |
| 2013/0158707 A1 * | 6/2013 | Lee | G06N 5/02 700/246 |
| 2014/0350723 A1 * | 11/2014 | Prieto | G05B 19/409 700/248 |
| 2014/0355880 A1 * | 12/2014 | Xuan | G06F 17/30247 382/170 |
| 2016/0004711 A1 * | 1/2016 | Soon-Shiong | G06Q 30/02 715/205 |

OTHER PUBLICATIONS

Chien et al., "Effects of Alarms on Control of Robot Teams," Proc. of the Human Factors and Ergonomics Society (2011) pp. 434-438.*

(Continued)

*Primary Examiner* — Brian M Smith

(57) ABSTRACT

A system and method in which a device will search for and work collaboratively with an expert to respond to a request that the device is unable to respond to on its own. The expert may be one or more of, or a combination of, a human, a virtual persona, a robot or another device.

15 Claims, 4 Drawing Sheets

(56) References Cited

OTHER PUBLICATIONS

Lewis et al., "Teams Organization and Performance in Multi-Human/Multi-Robot Teams," 2010 IEEE Intl. Conf. on Systems Man and Cybernetics (2010) pp. 1617-1623.*

Mainprice et al., "From autonomy to cooperative traded control of humanoid manipulation tasks with unreliable communication: System design and lessons learned" 2014 IEEE/RSJ Intl. Conf. on Intelligent Robots and Systems (Sep. 2014) 8 pp.*

Moskowitz et al., "Bandwidth as currency," IEEE Multimedia, vol. 1 No. 1 (2003) pp. 14-21.*

SUGIURA et al., "Real-Time Collision Avoidance with Whole Body Motion Control for Humanoid Robots," IEE/RSJ Intl. Conf. on Intelligent Robots and System (2007) 7 pp.*

Arumugam, R. et al., "DAvinCi: A cloud computing framework for service robots," 2010 IEEE Intl. Conf. on Robotics and Automation (May 3-9, 2010) pp. 3084-3089. (Year: 2010).*

Xia, Y., "From networked control systems to cloud control systems," Proc. of the 31st Chinese Control Conference (Jul. 25-27, 2012) pp. 5878-5883. (Year: 2012).*

Mavridis, N. et al., "The Human-Robot Cloud: Situated Collective Intelligence on Demand," Proc. 2012 IEEE Intl. Conf. on Cyber Technology in Automation, Control, and Intelligent Systems (2012) pp. 350-365. (Year: 2012).*

Mohanarajah, G. et al., "Rapyuta: a cloud robotics platform," IEEE Trans. on Automation Science and Engineering, vol. 12, Issue 2, pp. 481-493, noted at <ieeexplore.ieee.org/abstract/document/6853392> as available Jul. 11, 2014 (Year: 2014).*

\* cited by examiner

SYSTEM AND METHOD FOR A DEVICE TO WORK COLLABORATIVELY WITH AN EXPERT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD

The present application relates to semi and autonomous devices and specifically to collaborating with experts.

BACKGROUND

Devices all around us are becoming smarter. For instance, in 2006 Daewoo unveiled a voice recognition microwave oven. This is an autonomous device that at the time it was released was able to respond to 40 voice commands. As smart as it was, and even though it potentially had all of the necessary technical capabilities (e.g. the ability to generate sounds in response to buttons being pushed), it was unable to respond to a command such as, "Play me the William Tell Overture".

It is not the device could not potentially perform the task, it simply that it wasn't programmed to do so.

An autonomous device is a device that has the ability of an intelligent system to independently compose and select among different courses of action to accomplish goals based on its knowledge and understanding of the world, itself, and the situation it encounters. A semi-autonomous device is one that has the ability to do this in some domains, but not in all.

Within the domain of microwave cooking, the voice recognition microwave oven can be considered an autonomous device. However, when the microwave oven receives a request that is outside its domain, the user may here the familiar "I am unable to process the request at this time. please try again."

Siri is a remarkable autonomous personal assistance software application that almost everybody is at least aware of. Siri's domain expertise is not only that of the resources available on the iPad and the iPhone but through access to online databases it can do things like provide movie reviews and make reservations at a restaurant.

The way Siri works is as a web/cloud enabled device and if you aren't connected to the internet you will receive a message that Siri is unavailable. When you make a request to Siri such as, "Play me the William Tell Overture". Siri will parse the sentence both locally and on the web, and if it has enough confidence in its ability to respond locally, it will issue a response (e.g. "I could not find the William Tell Overture in your music"). If it cannot process it locally then it will search its online databases and try to provide an answer. Failing that, you will hear the familiar, "Here is what I found on the web . . . ."

At the far end is Watson, by IBM. Watson is the autonomous computer that prevailed on the TV show Jeopardy against its human competitors. During the game, Watson had access to 200 million pages of structured and unstructured content consuming four terabytes of disk storage, including the full text of Wikipedia, and was not even connected to the Internet during the game, although capable of doing so. As a result, Watson is a domain expert in almost every category except it did have trouble responding to categories having short clues containing only a few words and it also missed final Jeopardy, strangely responding "What is Toronto?" to a question about US cities.

To be a subject matter expert in essentially all domains, Watson is composed of a cluster of ninety IBM Power 750 servers, each of which uses a 3.5 GHz POWER7 eight core processor, with four threads per core. In total, the system has 2,880 POWER7 processor cores and has 16 terabytes of RAM, which is well beyond the capabilities of your average microwave oven let alone a voice controlled microwave oven.

However, if an autonomous device is web-enable (connected to the cloud) then it can search just like Siri does for answer to a question or a solution to a problem.

However, a direct solution might not always be available. For example the processing power or memory may be insufficient to implement the solution or the concept may be conceptual in nature requiring new skills and abilities or additional questioning capabilities that the autonomous system has yet to acquire. Even, when the autonomous system has the ability to learn the new skills and the system resources are available, it may simply take too much time for the autonomous system to go through the learning process.

On the other hand, domain experts exist. For instance, a digital keyboard that someone may have in their living room may have the ability to transpose music into a range playable by the microwave oven using the tones playable by the microwaves keypad and a search of YouTube videos reveals several people able to play the William Tell Overture on various devices, such as the keypad of their cell phone. So, there are potentially domain experts available, both fellow devices and humans, that could potentially accomplish the task with the resources available, such that the microwave oven could conceivably play the William Tell Overture.

What is missing is an effective way for these autonomous systems to interact with these experts to answers the user's query or to solve a problem.

SUMMARY

In order to overcome the deficiencies in the prior art, systems and methods are described herein.

One aspect of the claimed invention involves a system configured to allow domain experts to work collaboratively with a device to respond to a request, wherein the device is configured to determine if it has the ability to respond to the request and, if not, search for a specific domain expert that does and the to temporarily provide access to the system features of the device to the domain expert such that, through the device, the request can be responded to.

Another aspect involves a collaborative method between a device and an expert comprising the device determining if it has the ability to respond to a request, searching on a network for a expert with the ability to respond to the request, temporarily providing control of system features to the expert in order to solve the problem, and the device determining that the request has been appropriately responded to once control has returned to the device.

These and other aspects described herein present in the claims result in features and/or can provide advantages over current technology.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages or features are mutually exclusive or contradictory, in that they cannot be simultaneously present in a single embodiment. Similarly, some advantages are applicable to one aspect of the invention, and inapplicable to others. Thus, the elaborated features and advantages should not be considered dispositive in determining equivalence. Additional features and advantages of the invention will become apparent in the following description, from the drawings, and from the claims.

DETAILED DESCRIPTION

A system and method in which an autonomous device searches for domain experts to work collaboratively with to answer a user's question or solve a problem (respond to a request) and then provides access to its systems so that it can collaborate with that domain expert is far more advantageous than a system that simply searches for information or sends an alert back to a base station that it has a problem.

Figure 1:
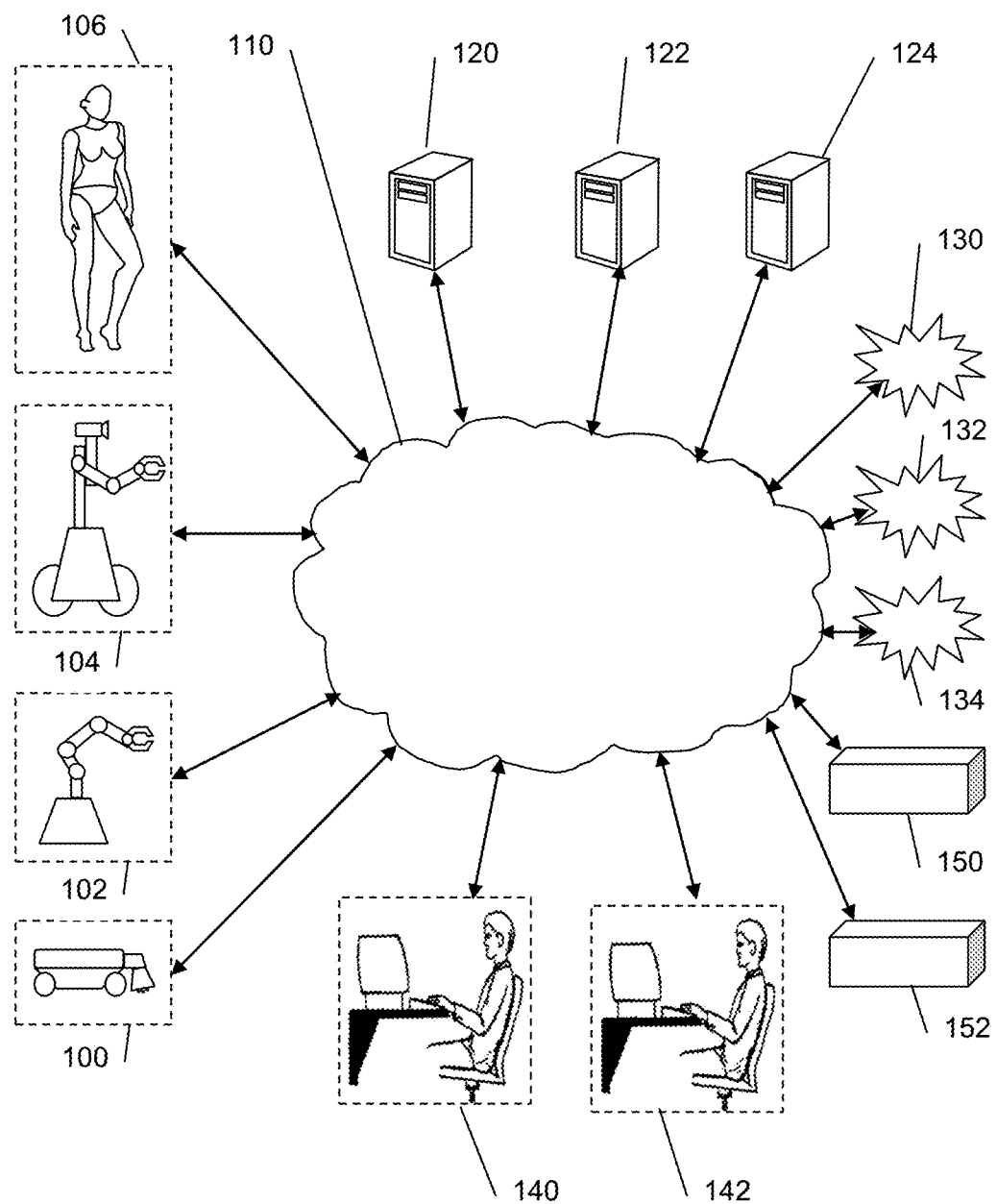
FIG. 1 shows in simplified form a cloud based system in which several autonomous devices are connected.

FIG. 1 shows in simplified form a cloud based system in which several autonomous devices are connected: it shows several exemplary autonomous (or semi-autonomous) devices from a self-driving vacuum 100, single purpose robot 102, a telemedicine robot 104, and an anthropomorphic robot 106. These autonomous (or semi-autonomous) devices are not meant to be an exhaustive list but to merely represent a range of devices.

The devices, each comprising a processor, memory storage, executable code and a network connection, are connected to a network/cloud 110 through which they can potentially also connect to each other as well as to one or more databases 120, 122, 124; one or more virtual personas 130, 132, 134; and one or more of both human 140, 142 and machine 150, 152 based domain experts.

A virtual persona is a gathering of data related to a person or system's information that includes its factual knowledge as well its emotional content.

Examples of virtual personas might be a virtual Bob Costas, which has a knowledge base related to sports and has the programmed ability to simulate Bob Costas conversationally. Other examples might be a celebrity from the adult entertainment industry that not only has the ability to simulate a conversation, as if they were that celebrity, but may additionally, through the capabilities of an anthropomorphic robot, have the ability to control the device in a manner for which that celebrity was famous.

However, virtual personas need not necessarily be based upon humans. For example, a robot that has been working cooperatively with an optometrist and developed specialized knowledge and skills in this domain area could upload a copy of itself to the cloud 110, as a virtual persona. Once uploaded, the virtual persona could either: provide information to either humans or other devices; work cooperatively with at least one other device, which may involve cooperating with humans as well; or be provided temporary control over a fellow device, which may then involve additionally collaborating with other devices and or humans.

Figure 2A:
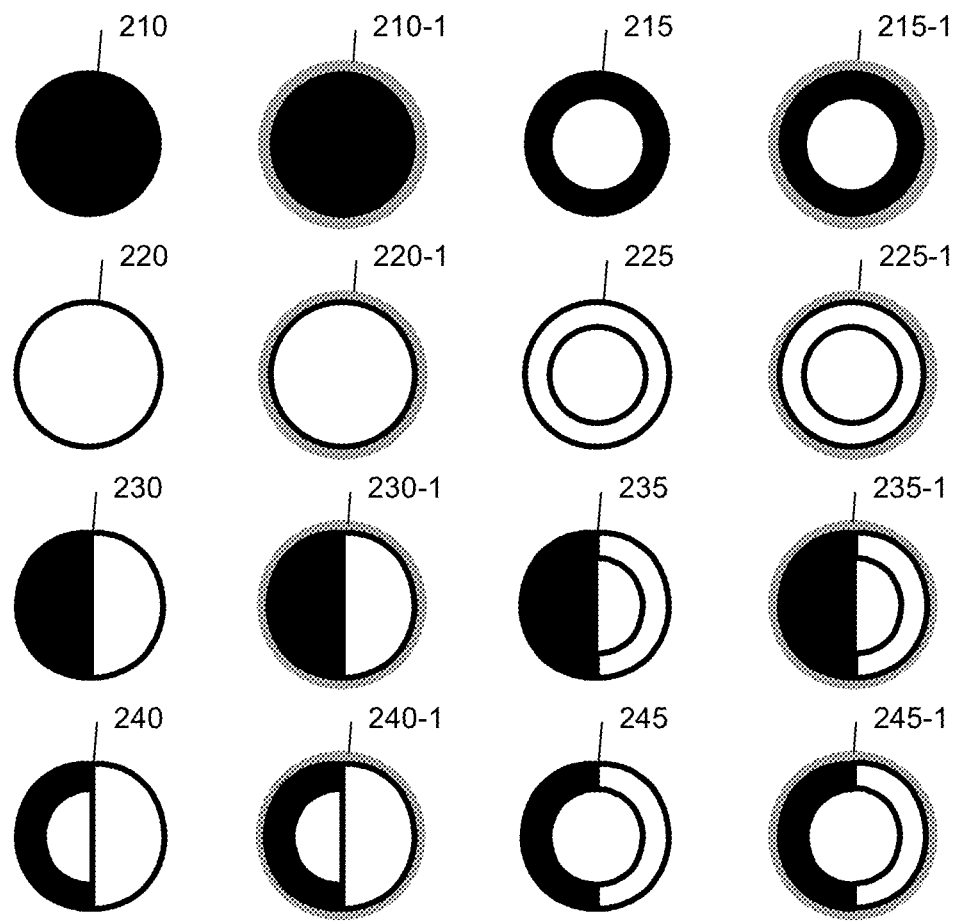
FIGS. 2A and 2B show in simplified form how the interconnections, as well as combination of relationships can be visually represented
Figure 2B:
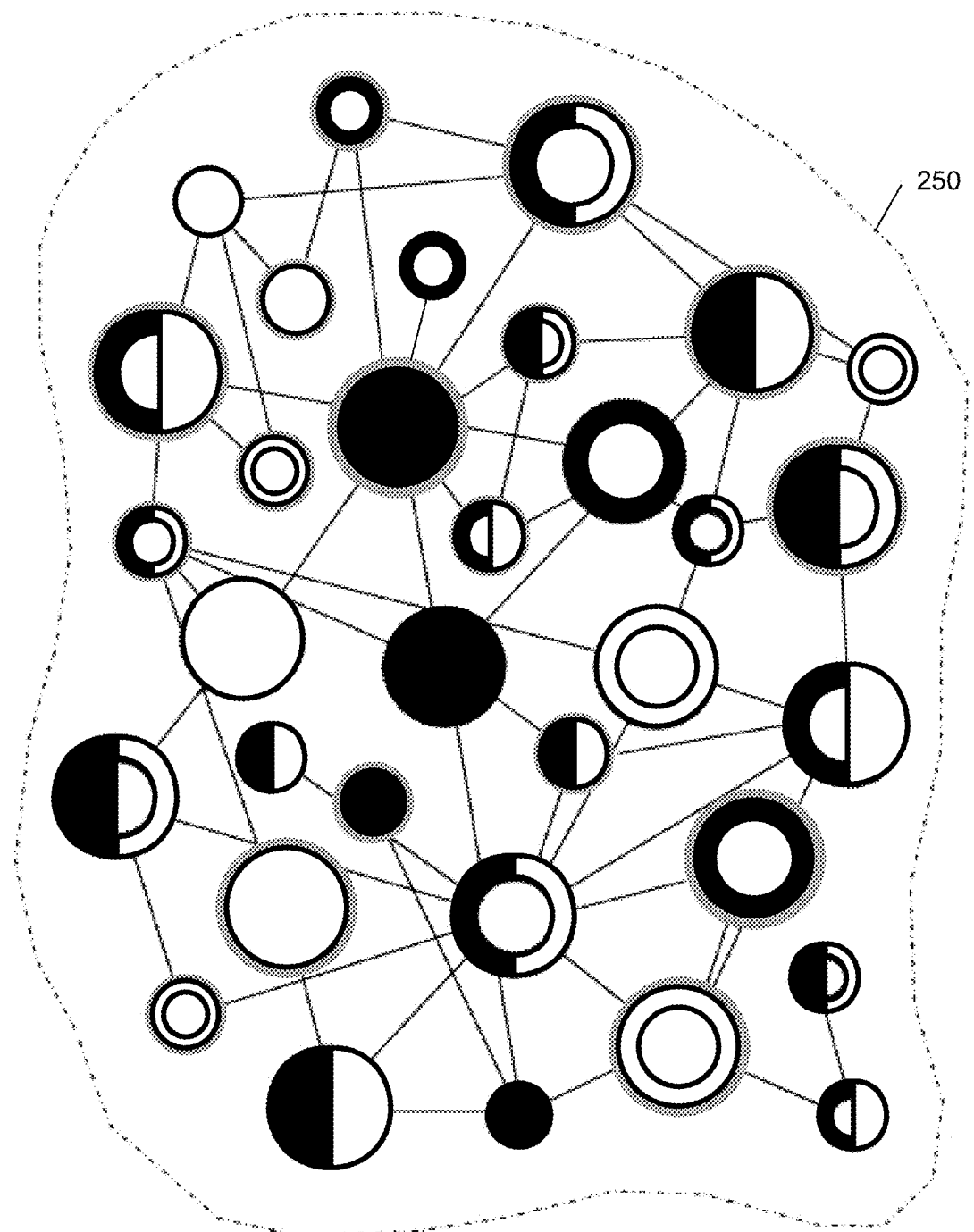

FIGS. 2A and 2B show in simplified form how the interconnections, as well as combination of relationships can be visually represented. With respect to the term "online" in the subsequent description of FIG. 2A, "online" means not only being connected to the network but currently having the ability to interact others as opposed to simply being a part of the network. FIG. 2A represents a labeled key to the interconnected relationships comprised in FIG. 2B. FIG. 2A includes the following entities: a user 210 represented by a solid black circle; an online user 210-1 represented by a solid black circle and with a grey circle surrounding it; a user's virtual presence 215 represented by a solid black circle with a hole in it, which is a virtual copy of the user comprising factual information that the user poses as well as an emotional profile of the user and may also have the ability to learn new factual information independent of the user; an online user's virtual presence 215-1 represented by a solid black circle with a hole in it and with a grey circle surrounding it; a "physical" robot (autonomous or semi-autonomous system) 220 represented by a solid white circle; an online robot 220-1 represented by a solid white circle and with a grey circle surrounding it; a robot's virtual presence 225 represented by a solid white circle with a hole in it, which may also have the ability to learn new factual information independent of the physical robot; an online robot's virtual presence 225-1 represented by a solid white circle with a hole in it and with a grey circle surrounding it; a user combined with a robot 230 represented by half a solid black circle and half a solid black circle, wherein the user is able to exercise some level of control over the robot; an online user with a robot 230-1 represented by half a solid black circle and half a solid black circle and with a grey circle surrounding it; a user with a virtual robot 235 represented by half a solid black circle and half a solid black circle with a hole in it, wherein the user is able to exercise some level of control over the virtual robot; an online user with a virtual robot 235-1 represented by half a solid black circle and half a solid black circle with a hole in it and with a grey circle surrounding it; a user's virtual presence with a robot 240 represented by half a solid black circle with a hole in it and half a solid white circle, wherein the user virtual presense is able to exercise some level of control over the robot or vice versa; an online user's virtual presence 240-1 represented by half a solid black circle with a hole in it and half a solid white circle and with a grey circle surrounding it; a user's virtual presence with a robot's virtual presence 245 represented by half a solid black circle with a hole in it and half a solid white circle with a hole in it, wherein the user virtual presense is able to exercise some level of control over the robot virtual presense or vice versa; an online user's virtual presence with a robot's virtual presence 240-1 represented by half a solid black circle with a hole in it and half a solid white circle with a hole in it and half a solid white circle and with a grey circle surrounding it. It should be noted that the choice of colors was arbitrary and could have been any color set or pattern that allowed the differentiation between users and robots (autonomous and semi-autonomous systems) as well as the differentiation as to whether or not they were online. Additionally, it should be noted that choice of a circular shape to indicate a user (or robot) and the removal of its center to indicate the virtual presence of the user (or robot) as part of a whole was arbitrary and could have been any shape set that symbolically represent a whole and a part of the whole, for example the yin and yang symbols could also have been used.

In FIG. 2B, various entities (as labeled in FIG. 2A) are interconnected within a network 250, where the lines between the entities represent an interconnection between entities. An interconnection between entities is a channel for one or more of either communication or control with/of another entity, which may be one directional, bi-directional, or simply a through channel for communication and or control to a different entity to which an entity of interest is not directly connected but to which other entities that it is connected to are connected.

The interconnections displayed need not necessarily be active and may represent historic connections made between entities. However, FIG. 2B is representative of the complex relationships through which experts can work collaboratively with an autonomous (or semi-autonomous) device.

While there are numerous examples of one or more humans working collaboratively with autonomous (or semi autonomous) devices, see table below, which are hereby incorporated by reference:

| Patent/Application | Title | Inventor(s) |
| --- | --- | --- |
| U.S. Pat. No. 5,231,693 A | TELEROBOT CONTROL SYSTEM | Backes et al. |
| U.S. Pat. No. 7,007,235 B1 | Collaborative agent interaction control and synchronization system | Hussein et al. |
| U.S. Pat. No. 8,527,094 B2 | MULTI-ROBOT MEDICAL ROBOTIC SYSTEM FOR COLLABORATION OR TRAINING IN MINIMALLY INVASIVE SURGICAL PROCEDURES | Kumar et al. |
| US 2005/0204438 A1 | GRAPHICAL INTERFACE FOR A REMOTE PRESENCE SYSTEM | Wang et al. |
| US 2010/0010673 A1 | Tele-presence robot system with multi-cast features | Wang et al. | these do not begin to address the complex interconnection of entities represented in FIG. 2B.

Of the references above, U.S. Pat. No. 5,231,693 by Backes et al. is considered by many to be a seminal work from which many of the concepts of telerobotic control in poorly modeled environment have their origins and are summarized in the following paragraphs.

Backes et al describes techniques for the operation and control of robotic manipulators (or other semi/autonomous devices) in well modeled environments, such as manufacturing facilities, which have been developed and used very successfully for decades. Such environments may be well modeled because the environment of the robotic work area can be well known.

However, even today, these techniques must be substantially modified for use in poorly modeled environments, or to perform tasks in response to unplanned scenarios.

Remote control of robotic operation may be accomplished by teleoperation, autonomous or supervisory control, as well as a combination of these approaches, which is known as shared control (e.g. a user combined with a robot 230 from FIGS. 2A and 2B).

Interactive robotic task planning, execution and monitoring can be accomplished with pure teleoperation. In this approach, planning resides within the operator's mind, execution is issued by the operator via remote controllers and monitoring is provided by sensory feedback to the operator.

Autonomous task planning, execution, and monitoring is the other extreme to teleoperation. Here, the operator initiates only very high level commands such as "replace the electronics module" and planning, execution, and monitoring is then done autonomously without further operator input.

Teleoperation has proven to be a valuable tool for many tasks especially in un-modeled or poorly modeled environments and for unplanned scenarios. The increasing complexity of the tasks to be performed places an ever increasing burden on the "operator".

As a result, autonomous control is becoming increasingly valuable as a tool to relieve the operator of many task planning, execution, and monitoring responsibilities in order to allow the "operator" to concentrate on the more crucial elements of a task.

Supervisory and shared control are improvements in telerobot task execution for unplanned scenarios, or for poorly modeled environments.

Supervisory control is where the "operator" selects execution parameters for autonomous execution of a task and can stop execution at any time.

Shared control is the mixing of inputs from an "operator" and an autonomous control system during task execution.

A key element needed for planning, execution, and monitoring in a supervisory or shared control system is an "operator" interface, which supports shared and supervisory control system features of the device.

Supervisory control of system features are required to permit the "operator" to set up teleoperation, autonomous, and shared control task environment parameters and to provide specific input parameters for autonomous task primitives and teleoperation control.

A task primitive is a reusable, predetermined, self contained, preprogrammed program for controlling a robot to accomplish a task, such control being dependent upon a set of input parameters, which may be designated before or at the time of task execution.

Shared system features of an "operator" interface are required in order to provide autonomous setting of some environment and control parameters depending upon task context.

The general principles specified above are for one of more humans to work collaboratively with robot or other semi/autonomous device; however, there is no mention in any of these works cited above, other than a brief mention by Wang et al. US 2005/0204438 in paragraph [0018], that devices may be controlled by "other robots" (let alone the combinatorial relationships, virtual or otherwise, specified in FIG. 2A). Furthermore, this mention by Wang et al. appears to have been inserted as an afterthought, since there is no actual disclosure as to how this might be implemented other than the words "or other robots".

The general principles specified above are especially true in un-modeled or poorly modeled environments and for unplanned scenarios. In these situations, a robot or other semi/autonomous device may be reaching out to not just a human but to another robot or other semi/autonomous device for the very first time.

Similar to the way humans can work cooperatively with a robot is well defined. There are numerous examples of one or more humans working collaboratively with a human expert, see table below, which are hereby incorporated by reference:

| Patent/Application | Title | Inventor(s) |
|---|---|---|
| U.S. Pat. No. 6,829,585 B1 | Web-based method and system for indicating expert availability | Grewal et al. |
| U.S. Pat. No. 7,120,647 B2 | Web-based method and system for providing expert information on selected matters | Venkatesh et al. |
| U.S. Pat. No. 8,117,196 B2 | Search tool providing optional use of human search guides | Jones et al. |

Again, in order to implement these general principals in the works above to an environment where one robot or other semi/autonomous device seeks the assistance of another robot or other semi/autonomous device (or any of the entities specified in FIG. 2A), there is an additional exchange of information that must take place that was not appreciated (or even considered) by these authors that where dealing with human interactions.

Figure 3:
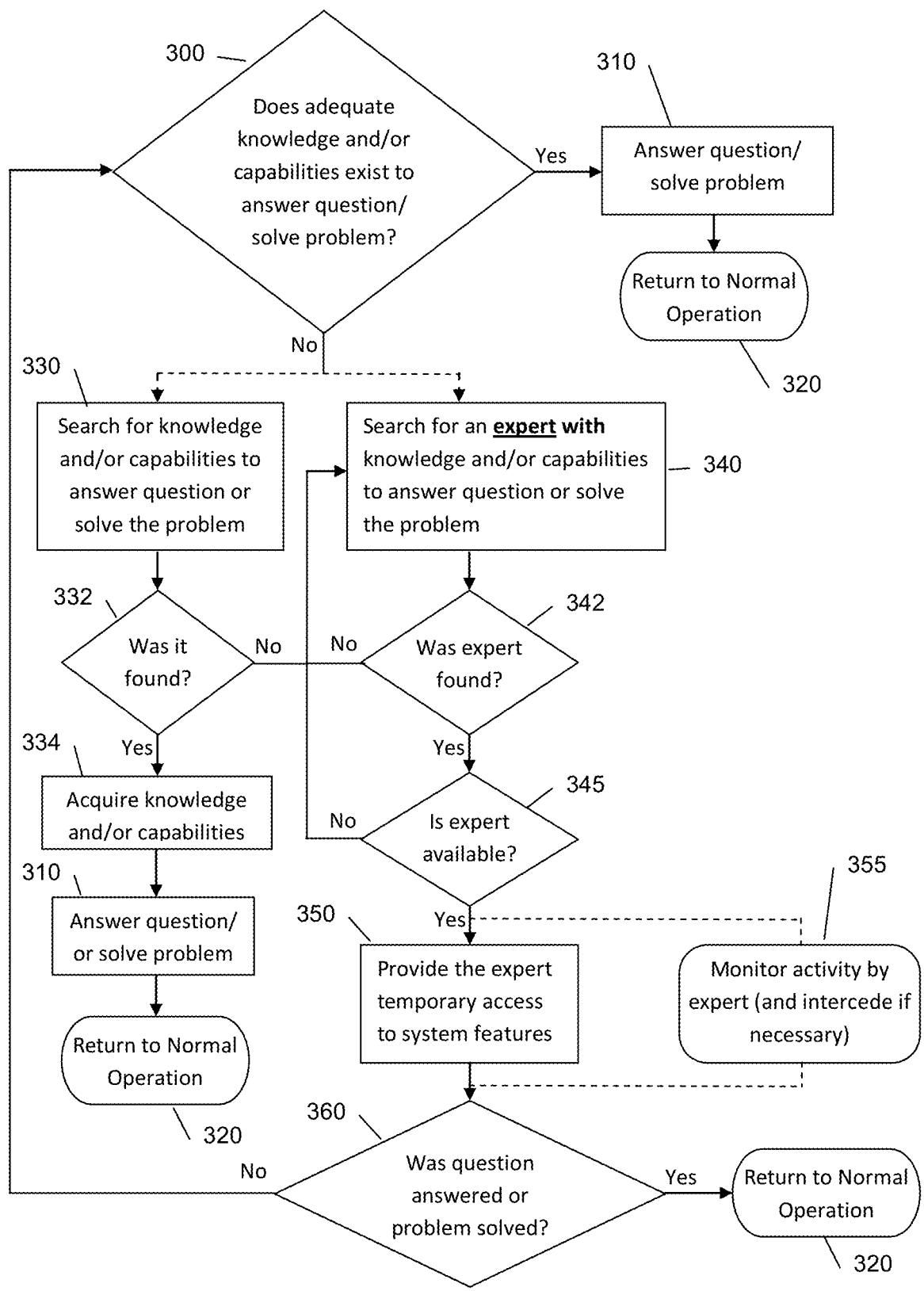
FIG. 3 shows in simplified form a flow diagram of the process of a semi/autonomous device when it is posed with a question/problem that it needs to solve.

FIG. 3 shows in simplified form a flow diagram of the process of a semi/autonomous device when it is posed with a question/problem that it needs to solve (a request). The first step is a decision 300, in which the semi/autonomous device queries its internal information to see if it has adequate knowledge and/or capabilities to respond to the request by either answering the question/solving the problem. The query may involve one or more of the following: simple matching of the request to a database of requests and responses; parsing within the request embedded stings based upon smaller and smaller elements until a match to a request can be determined that meets a predetermined confidence level, which could, for example be to base the percentage of nouns matched; initial reduction of phrases into known requests and then performing a match; using the content of previous communications or the environment to help determine the confidence in the answer; using the emotional state/personality of one or more of either the requestor or the semi/autonomous device to determine the confidence (e.g. using the fact that the requestor recently swore at the device to decrease the level of confidence or that the device currently is programmed with a dominating personality to increase the confidence in the response); taking into account past performance of whether or not previous responses to similar requests (e.g. with a similar confidence level in the same domain) where correct or not and using that to influence confidence level; and using things such as requester's preferences (e.g. whether or not they are willing to pay a fee for or their tolerance for incorrect responses) to help determine whether or not the device has adequate knowledge or capabilities to answer the request.

In this regard, it should be understood that the techniques are representative of typical techniques for purposes of understanding. It is to be understood that other techniques, whether standard or proprietary can be used to the same or similar effect for querying internal information, again, the important aspect being the ability to determine if it has adequate knowledge and capabilities to answer question or solve problem, not the particular querying or protocol used.

If it has both the adequate knowledge and capabilities to answer question/solve problem 310 then device would do so and then return to normal operation 320.

If either adequate knowledge and/or capabilities do not exist internally to respond to the request then it might perform an external search for adequate knowledge and/or capabilities to answer question/solve problem 330. Additionally, at the same time it is doing the external search 330, or in lieu of doing the external search, the system could optionally begin searching for an expert 340 with knowledge and/or capabilities to answer question/solve the problem or it could wait to see if its external search 330 is unsuccessful before it begins searching for an expert 340.

Similar to the internal search, the external search 330 may involve not only one or more of the methods specified for the internal search performed external service but also one or more of: simply taking the first response that is reported back as a match, computing a confidence level of the response (e.g. the percentage and number of matching nouns between the request and the response); giving higher confidence to external sources that are experts in the domain of the request, and taking into account meta data such as the number of likes/dislikes, country of origin of the contributor, number of views, and or detractor words within the content such as profanity, racial slurs, or words or phrase like "guessing", "I am not sure", or "I think".

In this regard, it should be understood that the techniques are representative of typical techniques for purposes of understanding. It is to be understood that other techniques, whether standard or proprietary can be used to the same or similar effect for external search (such as querying external databases), again, the important aspect being the ability to determine if an external source has adequate knowledge and capabilities to answer question or solve problem, not the particular searching or protocol used.

If the determination 332 that the external search 330 was successful then the next step three steps would be to acquire knowledge and/or capabilities 334, answer question/solve problem 334, and then return to normal operation 320.

The step of acquiring knowledge and/or capabilities 334, if it was not already acquired in the step of searching for adequate knowledge and/or capabilities to answer question/solve problem 330, may involve one or more of the following: downloading a task primitive, updating the device's operating system, connecting to an external data source/device, or repurposing existing system capabilities through settings changes (e.g. broadcasting a ultrasonic signal using an existing speaker, in the event someone asked a microwave oven if they could get their dog to stop barking).

In this regard, it should be understood that the techniques of acquiring knowledge and/or capabilities are representative of typical, known techniques for purposes of understanding. It is to be understood that other techniques, whether standard or proprietary can be used to the same or similar effect for external search, the important aspect being the ability to acquire knowledge and/or capabilities, not the particular technique or protocol used.

However, if the determination 332 that the external search 330 was not successful then the next step begin searching for an expert 340 with knowledge and/or capabilities to answer question/solve the problem, or otherwise respond to the request.

While a human being may be able to make a decision about whether or not some is an expert based on the type of information typically supplied on a business card: company name, title, area of expertise, location . . . etc. and possibly the addition of online rating system, this information would typically not be enough for a semi/autonomous device to know if an expert would be able to assist them.

In addition to the same types of information that humans might use, the semi/autonomous device also needs to know if the expert has the ability to exercise some level of control over the shareable system features of the device and whether or not there is an adequate operator interface available. The determination that the expert has the ability to exercise some level of control over the device and whether or not there is an adequate operator interface available could either be made by the semi/autonomous device, the expert themselves or through a consultative process or through a third party resource.

To return to the example of the microwave oven trying to play the William Tell Overture, mentioned in the background section of this document. The microwave oven would have first searched internally and then, if connected to a network, searched to see if the knowledge/skills already exist that it could acquire. Failing the first to steps, it may then begin searching for experts.

The microwave oven, assuming it was able to parse the request, if not it may need to seek out an expert to first parse the request, might look for an expert that has the ability to play music, specifically the William Tell Overture, based upon key presses.

As previously mentioned the results of the expert search may have turned up two experts: 1) a digital keyboard located in the living room based upon its listed capabilities: ability to play music based upon keyboard input, auto transpose feature, store music and music play back and 2) a human posted a video that has the caption, "Me playing the William Tell Overture using the keypad on my phone."

While an additional exchange of information may yield the fact the digital keyboard is able to remotely control the tones produced by pressing the keys on the microwave oven, the query to the human may reveal the fact that she lacks the operator interface to do it remotely but will gladly come do it in person if the microwave is willing to pay for her time and travel.

So, after completing the search the next stop would be to determine if there was an expert found 342, which would involve verifying that the expert has both the ability to exercise some level of control over the shared system features of the device and whether or not there is an adequate operator interface available. If No, then it would continue to search for additional experts, which it may continue to do forever, until it search all of the experts available, searched a certain number of experts, timed out or some other predetermined criteria. If yes, then the next step would be to determine if the expert was available 345.

For the microwave oven, in the case of the digital keyboard the answer might be yes but in the case of the human the answer might be no, or it might not be able to make that determination of availability by itself. For instance, the normally autonomous system might be semi autonomous when it comes to approving/making payments. So in this particular case the microwave oven may respond back to the end robot. "I currently do not have the ability to play the William Tell Overture but I have located two experts. One is a digital keyboard that based on its lack of use does not have a very high rating but is immediately available. The other is a human that is extremely highly rated based on video views and likes but would need to fly in from California with an earliest possible arrival of 10 PM and an estimated cost of $10,562.37, including tax. Would you likely to authorize me to book the highly rated human expert or go with the less highly rated digital keyboard?"

In the example above, both the digital keyboard and the human in the domain of playing music would be considered to have a higher level of overall technical capabilities than the microwave oven. However, that need not be the case.

For example referring back to FIG. 1, the telemedicine robot 104 may need to go to a new location, room 207, in a part of the hospital that it has yet to be and therefore does not have its locations mapped. The telemedicine robot 104 may have sophisticated route planning and obstacle avoidance capabilities. However, until it has the rooms mapped it is unable to take advantage of them. On the other hand, the self-driving vacuum 100 that is also part of cloud 110, may have very rudimentary navigation and obstacle avoidance capabilities but already know how to get to room 207 because it is part of its cleaning routine.

The telemedicine robot 104, may look for an expert to navigate it to room 207 and may find the self-driving vacuum 100. Since the two devices may navigate using different methodologies it might not be possible for the telemedicine robot 104 to acquire the information that it needs from the self-driving vacuum 100. However, if the telemedicine robot 104 turns over the drive controls to the self-driving vacuum 100 but possibly maintains the obstacle avoidance capabilities then, while it might not get there as efficiently as if it knew the route itself, it will still be able to get there. Additionally, the telemedicine robot 104 can also map the rooms on the way there in order to find an efficient route for the next time.

If the hospital owns both devices then there would likely not be a cost associated with doing this, especially if the self-driving vacuum 100 was otherwise idle. However, that need not necessarily be the case. Maybe the self-driving vacuum 100 is owned by the cleaning company instead of the hospital. In which case, there may have been some type of currency exchange or billable cost associated with the services provided by the device just as if there might be a cost as if a human had provided the service.

Advantageously, the cost savings associated with another device providing the service as opposed to a human could be astronomical. It might cost $10 to have a technician remotely connect and manually drive the robot to room 207 for the first time. However, it might only cost pennies for the self-driving vacuum 100 to do it.

Once and expert was found 342 and it was determined that the expert was available 345 then the next step would be to provide the expert temporary access to the shareable system features 350 in order for the expert to answer the question/solve the problem, which may involve the local device monitoring activity by expert (and intercede if necessary) 355. The temporary access could be autonomous, supervisory control or shared control and either the device or the expert can potentially act in the supervisory role. For instance, in the case of the self-driving vacuum 100 driving the telemedicine robot 104 to room 207, the telemedicine robot 104 may maintain supervisory authority; however, in the case of a technician, the supervisory control may be ceded to the technician.

Temporary access may be provided based upon a time limit, up until task is completed, as long as the device has not determined that it needs to intercede, or some other predetermined criteria.

The final step would be to determine if the question answered or problem solved 360 and if, in fact, the request was appropriately responded to then to return to normal operation 320 or if not to begin the process all over again.

When providing the expert temporary access to system features 350 this may involve cosmetic as well as functional features. For instance, in the example where the expert is a virtual persona of a celebrity from the adult entertainment industry, as well as being given temporary access to the voice output and the ability to exert physical control over the anthropomorphic robot 106, the robot may be capable of undergoing physical changes as well. For example, there may be inflatable/deflatable bladders such that matching body measurements could be achieved or lens may be used to provide a matching eye color, as examples of a few of the possible corresponding physical changes.

With respect to the monitoring of activity by expert (and interceding if necessary) 355, this step could also involve system learning taking place, which depending on the agreement reached with the expert may or may not be allowed. Again, in the example of the adult film star, the interactions may be governed under copyright and the device may or may not be able to record and later perform the same activity. In the case, of the microwave oven it may be able to record the action for later playback and will be able to add play the William Tell Overature to its list of verbal commands for the future.

Ideally, every device would have the capabilities to search for domain experts to work collaboratively with in order to answer a user's question or solve a problem and then provides access to its systems so that it can collaborate with that domain expert. However, some or all of the steps of searching 340, determining if there is a match 342 and determining availability 342 may be beyond the capabilities of some devices. In this particular case, one or more of these steps may be performed by a separate expert system, which does the matching, which may or may not be a fee-based service.

So returning to the microwave oven example, the microwave oven may only have the capability to contact a domain expert matching service as a means of searching for an expert 340, when it is unable to match the verbal request within its database of commands. The expert matching system could perform all of the matching on behalf of the microwave oven and then once found the microwave oven could provide the domain expert with temporary access to the system features. Alternatively, the microwave oven could simply provide the expert matching service with temporary control to its system features when it contacted the expert matching system and then the expert matching system could then provide sub access to the system features. Advantageously, in this scenario the expert matching system could optionally perform monitoring of the activity (and interceded if necessary) and potentially be the one responsible for determining if the question was answered of the problem was solved 350, which may also be skills beyond that of the contacting system (the microwave).

With the use of an expert matching system as just described, even seemingly insignificant devices can become universal problem solving systems and their skills can greatly be expanded and ushering the next wave of connected systems.

Finally, it is to be understood that various different variants of the invention, including representative embodiments and extensions have been presented to assist in understanding the invention. It should be understood that such implementations are not to be considered limitations on either the invention or equivalents except to the extent they are expressly in the claims. It should therefore be understood that, for the convenience of the reader, the above description has only focused on a representative sample of all possible embodiments, a sample that teaches the principles of the invention. The description has not attempted to exhaustively enumerate all possible permutations, combinations or variations of the invention, since others will necessarily arise out of combining aspects of different variants described herein to form new variants, through the use of particular hardware or software, or through specific types of applications in which the invention can be used. That alternate embodiments may not have been presented for a specific portion of the description, or that further undescribed alternate or variant embodiments may be available for a portion of the invention, is not to be considered a disclaimer of those alternate or variant embodiments to the extent they also incorporate the minimum essential aspects of the invention, as claimed in the appended claims, or an equivalent thereof.

What is claimed is:

1. A system comprising:
at least a first, second, and third devices;
wherein the first, second, and third devices each comprise a processor, memory storage, executable code, and a network connection, wherein the first, second, and third devices are each connected to the network and the first device has one or more physical control features, which are not directed to displaying information, that are controllable autonomously by at least one or more of the second or third devices through an interface;
wherein the first device is configured to receive and respond to requests by a user and further configured such that when it receives a request that it has not been modeled to accomplish, neither by itself nor in combination with either the second or third device through predefined agreement, to search among at least the second and third devices for an expert device that has the ability to respond to the request using one or more of the physical control features, to exchange information with the expert device regarding the interface such that the expert device can make a decision regarding the expert device's ability to solve the problem using the interface to access the one or more of the physical control features, to reach an agreement with the expert device about level of control to be utilized and any associated payment for responding to the request, and based upon the agreement being reached for the first device to temporarily provide control to the one or more physical control features to the expert device; and
wherein the first device is further configured to determine if the request was appropriately responded to once control has returned to the first device.

2. The system of claim 1, wherein the first device is further configured to monitor the activity of the expert device during the temporary control to the one or more physical control features and to intercede if necessary.

3. The system of claim 1, wherein the physical control features perform a mechanical action.

4. The system of claim 1 further configured to allow one or more human experts, independent of the second and third devices, to also be connected to the network, and that have an ability to respond to the request using one or more of the physical control features and wherein the first device is also configured to search for human experts that have the ability to respond to the request using one or more of the physical control features.

5. The system of claim 4, further comprising at least a fourth device comprising a processor, memory storage, executable code, and a network connection wherein the fourth device is configured to collaborate with the one or more of the human experts.

6. The system of claim 1, wherein the expert device comprises a virtual persona.

7. The system of claim 5, wherein the fourth device comprises a virtual persona is configured to collaborate with the one or more of the human experts.

8. A system comprising:
at least a first, second, and third devices;
wherein the first, second, and third devices each comprise a processor, memory storage, executable code, and a network connection, wherein the first, second, and third devices are each connected to the network and the first device has one or more physical control features, which are not directed to displaying information, that are controllable autonomously by at least one or more of the second or third devices through an interface;
wherein the first device is configured to receive and respond to requests by a user and further configured such that when it receives a request that it has not been modeled to accomplish, neither by itself nor in combination with either the second or third device through predefined agreement, to search among at least the second and third devices for an expert device that has the ability to respond to the request using one or more of the physical control features, to exchange information with the expert device regarding the interface such that the expert device can make a decision regarding the expert device's ability to solve the problem using the interface to access the one or more of the physical control features, to reach an agreement with the expert device about level of control to be utilized, and based upon the agreement being reached for the first device to temporarily provide control to the one or more physical control features to the expert device; and
wherein the first device is further configured to determine if the request was appropriately responded to once control has returned to the first device.

9. The system of claim 8, wherein the agreement further comprises whether or not there is any associated payment for responding to the request.

10. The system of claim 8, wherein the first device is further configured to monitor the activity of the expert device during the temporary control to the one or more physical control features and to intercede if necessary.

11. The system of claim 8, wherein the physical control features perform a mechanical action.

12. The system of claim 8 further configured to allow one or more human experts, independent of the second and third devices, to also be connected to the network, and that have an ability to respond to the request using one or more of the physical control features and wherein the first device is also configured to search for human experts that have the ability to respond to the request using one or more of the physical control features.

13. The system of claim 12, further comprising at least a fourth comprising a processor, memory storage, executable code, and a network connection wherein the fourth device is configured to collaborate with the one or more of the human experts.

14. The system of claim 8, wherein the expert device comprises a virtual persona.

15. The system of claim 13, wherein the fourth device comprises a virtual persona is configured to collaborate with the one or more of the human experts.

* * * * *